United States Patent [19]

Collette et al.

[11] Patent Number: 4,923,723

[45] Date of Patent: May 8, 1990

[54] MULTI-LAYER PREFORM, METHOD OF FORMING PREFORM, AND CONTAINER FORMED FROM THE PREFORM

[75] Inventors: Wayne N. Collette, Merrimack; Suppayan M. Krishnakumar, Nashua; Thomas E. Nahill, Amherest, all of N.H.

[73] Assignee: Continental PET Technologies, Inc., Norwalk, Conn.

[21] Appl. No.: 265,775

[22] Filed: Nov. 1, 1988

[51] Int. Cl.⁵ .............................................. B65D 23/00
[52] U.S. Cl. .................................. 428/35.7; 215/1 C; 215/12.1; 428/36.7; 428/212; 428/213; 428/542.8
[58] Field of Search ..................... 428/35.7, 36.6, 36.7, 428/213, 215, 542.8, 252; 215/1 C, 12.1

[56] References Cited

U.S. PATENT DOCUMENTS 4,728,549  3/1988  Shimizu et al. ..................... 428/36.7

Primary Examiner—James Seidleck
Attorney, Agent, or Firm—Charles E. Brown; Paul Shapiro; Charles A. Brown

[57] ABSTRACT

An injection molded plastic preform for forming by blow molding a container such as a bottle. The preform is of a laminated construction and in the body area includes inner and outer layers of the same plastic and an intermediate layer of a different plastic. The bottom portion of the preform is provided with a core layer of still a third plastic with the injection temperature of the third layer being sufficient to erode the contacted part of the intermediate layer which is of a lower melt temperature. The third plastic may be the same plastic as the first plastic, but injected at a higher temperature. Generally speaking, the neck finish of the preform will be of a single layer of the first material, the body of the preform will be of a three ply construction which is also true of the bottom with there being an intermediate area of five ply where the bottom core layer projects into the lower portion of the intermediate layer.

16 Claims, 1 Drawing Sheet

MULTI-LAYER PREFORM, METHOD OF FORMING PREFORM, AND CONTAINER FORMED FROM THE PREFORM

This invention relates in general to new and useful improvements in plastic preforms from which plastic containers are blow molded, and most particularly to a plastic preform which is of a laminated construction.

Polyethylene terephythalate (PET) preforms and containers blow molded from such preforms are well known. However, PET per se does not have all of the necessary physical characteristics desired for containers. Accordingly, there has been developed a laminated preform which is primarily of a five layer construction including PET inner and outer layers, inner and outer intermediate barrier layers and a core which may be formed of PET or some other plastic. Krishnakumar et al U.S. Pat. No. 4,609,516 granted Sept. 2, 1986 and Beck U.S. Pat. No. 4,550,043 granted Oct. 29, 1985 are typical of recent patents granted with respect to laminated preforms and containers blow molded therefrom.

Containers which are blow molded from plastic preforms, such as PET, have a high degree of biaxial orientation in the bodies thereof, while the biaxial orientation of the base portions of such containers is greatly reduced with the extreme center of the base portion having little or no biaxial orientation. This lack of biaxial orientation of the base portion is due to the fact that there is minimal stretching of the preform in the base portion of the container. It is therefore not necessary that the base portion of the preform and the resulting container be of the same construction as the body portion.

It is also well known to form preforms and resultant blow molded containers of a three layer construction wherein the inner and outer layers are PET and the intermediate layer is of an entirely different material including barrier material. However, such preforms and resulting containers have the deficiency in that when the intermediate layer is last injected, there remains in the associated nozzle a certain amount of such intermediate layer material which should not form part of the inner surface of the next injected preform and the resultant container.

In accordance with this invention, there is provided a preform which includes inner and outer PET layers and an intermediate layer of a plastic material other than PET and wherein in the base portion or bottom forming portion of the preform, the intermediate layer has been replaced by a PET core layer so that the last plastic material remaining in the injection nozzle is PET.

Further, by injecting the PET core layer at a materially higher temperature than the injection temperature of the intermediate layer, the PET core layer erodes the last injected intermediate layer and penetrates the same to provide a limited portion of a five layer construction.

With the above and other objects in view that will hereinafter appear, the nature of the invention will be more clearly understood by reference to the following detailed description, the appended claims, and the several views illustrated in the accompanying drawings.

Figure 1:
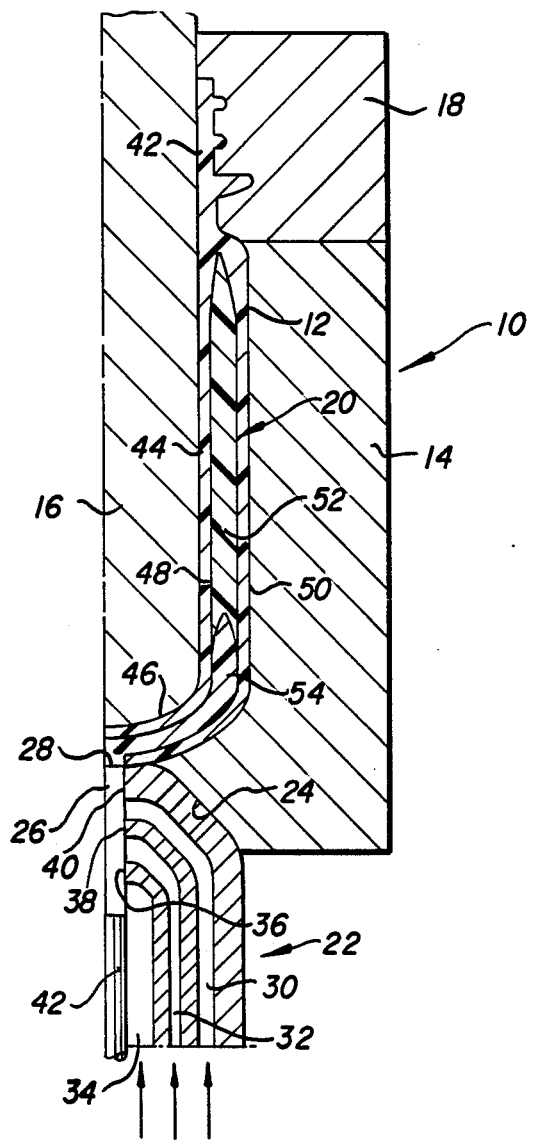
FIG. 1 is a half sectional view taken through an injection mold for a preform for forming a bottle and like containers with there being associated with the injection mold a nozzle for injecting three different plastic materials into the injection mold.

Referring now to the drawings in detail, reference is first made to FIG. 1 wherein there is illustrated in half section one cavity of a multiple cavity injection mold 10. Each cavity, which is identified by the numeral 12, is in part formed by the mold body 14 and by a core 16. Part of each cavity 12 is also formed by a neck ring 18.

There is associated with cavity 12 a nozzle which has a closable gate. After the required plastic material is injected into the cavity 12, the gate is closed. After the injected plastic material has set sufficiently, the core 16 together with the injection molded preform 20 and the neck ring 18 are retracted relative to the body 14, after which the neck ring 18 is split and the preform 20 is stripped from the core 16. The core 16 and the neck ring 18 are then reassembled with the body 14 and the cavity 12 is now ready to receive flowable plastic material from the nozzle.

In accordance with this invention there is utilized a special nozzle, generally identified by the numeral 22. The nozzle 22 per se is not part of this invention. The nozzle 22 seats in a recess 24 in the mold body 24 in sealed relation at the bottom of the cavity 12. The nozzle 22 has a gate 26 which opens into the cavity 12 through an opening 28 at the bottom of the cavity.

The nozzle 22 is of a construction so as to provide for the separate flow of the three different plastic materials through the gate 26. The passages are concentrically arranged and include an outer passage 30, an intermediate passage 32 and a central passage 34. Further, the gate 26 includes an innermost gate surface 36 for closing off the passage 34, an intermediate gate surface 38 for closing off the passage 32 and an outermost gate surface 40 for closing off the passage 30. The gate surfaces 36, 38 and 40 are sequentially engaged in sealed relation by means of a retractable pin 42.

There will next be seen that the preform 20 includes a neck finish portion 42 which is defined exteriorally by the neck ring 18, an intermediate body portion 44 and a lower bottom forming portion 46. The neck finish 42 has an open end while the bottom forming portion 46 is closed.

It is understood that it is feasible to form the preform 20 of only two materials by first injecting into the cavity 12 a measured amount of a first material and immediately thereafter finally filling the cavity 12 with a second material. The net result will be that the neck finish 42 will primarily, if not solely, be formed of the first material while the body 44 and the bottom forming portion 46 will be of a laminated construction including an inner layer 48 and an outer layer 50 of the first plastic material and an intermediate layer 52 of the second plastic material.

As will be apparent from FIG. 1, if only two flowable plastic materials are utilized to form the preform 20, then the last injected material will be that of the intermediate layer 52. The net result will be that some of the last injected second plastic material will remain in the nozzle 22 and will be that which is first injected into the cavity 12 upon the formation of the next following preform 20. However, this is not permissible in that the plastic material utilized in forming the intermediate layer 52 is a material which is not acceptable for forming the product engaging inner surface of the resultant container which is blow molded from the preform 20.

At this time it is pointed out that it is feasible in accordance with this invention to overcome the above set forth objection to a two material laminated preform by first injecting a predetermined amount of the first plastic material, then injecting a predetermined amount of the second material, followed by filling the cavity 12 with the first material. This will result that the residue of the plastic material remaining in the nozzle 22 would be the first plastic material.

The aforedescribed preform would preferably be formed with the first material being PET and the second material being a barrier material such as MXD-6 nylon although the second plastic material could be other than a barrier material, such as colored plastic, a plastic having a high Tg, etc.

A further improvement in accordance with this invention is to utilize a nozzle, such as a nozzle 22 with which a third and separate plastic material may be injected into the cavity 12 to terminate the preform formation. The third plastic material may also be PET although preferably it would be at a higher temperature than the PET of the first material.

At this time it is pointed out that when the temperature of the injected PET is too high, acetaldehyde (A/A) is a PET melt by-product which adversely affects the taste of certain soft drinks, particularly colas. It has been found that a proper preform 20 may be formed if the plastic material injected into the cavity 12 through the passage 30 is PET having a temperature on the order of 520° F.

The first plastic material is injected into the cavity 12 by withdrawing the pin 42 only sufficiently to clear the gate surface 40 and the uncovering of the passage 30. The first material is delivered into the cavity 12 as a premeasured charge which in a typical preform would constitute 50-60% of the volume of the preform.

As soon as this first charge is directed into the cavity 12, the pin 42 is retracted further so as to clear the gate surface 38 and the exit of the passage 32. At this time a premeasured amount of the second material will be directed into the cavity 12 and in accordance with the aforementioned Krishnakumar et al and Beck patents, will penetrate into the first charge of plastic material already injected into the cavity 12 so as to form the center or intermediate layer of a three layer construction. In the formation of a typical preform, the premeasured quantity of the second material constitutes 30-40% of the volume of the preform 20 and is injected into the cavity 12 at its normal melt temperature.

Finally, in accordance with this invention, the pin 42 is fully retracted to the position shown in FIG. 1 where it not only clears the gate surface 36, but also permits flow of the third plastic material through the nozzle 22 from the passage 34. Preferably the passage 34 is directly connected to the extruder for the PET so that the charge of the plastic material coming through the passage 34 completely clears the nozzle 22.

In a normal preform construction, such as that shown in FIG. 1, the volume of the plastic material lastly injected into the cavity 12 will be on the order of 10% of the volume of the cavity. Preferably the third material will be injected at a temperature which is on the order of 50°-100° F. higher than the temperature of the second plastic material. For example, the third plastic material may have a temperature on the order of 50° F. higher than the temperature of the second material with the temperature of the third plastic material being sufficiently above that of the second plastic material so as to cause an erosion of the last injected portion of the second plastic material as is shown in FIGS. 1 and 3.

Figure 3:
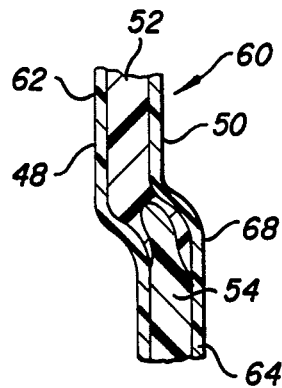
FIG. 3 is an enlarged fragmentary sectional view taken through the wall of the container in the indicated encircled area of FIG. 2.

Referring to FIGS. 1 and 3, it will be seen that the third plastic material forms a core layer 54 which in effect replaces the intermediate layer 52 in the bottom forming portion 46 of the preform. Further, because the relatively hot third plastic material erodes the last injected portion of the intermediate layer 52, the core layer 54 penetrates into the intermediate layer 52 so as to provide for a short distance a five layer construction.

It is to be understood that the last injected plastic material opens through the bottom of the cavity 12 and forms an exposed outer part of the preform 20 so that the extreme central portion of the preform 20 is of a two layer construction only.

Figure 2:
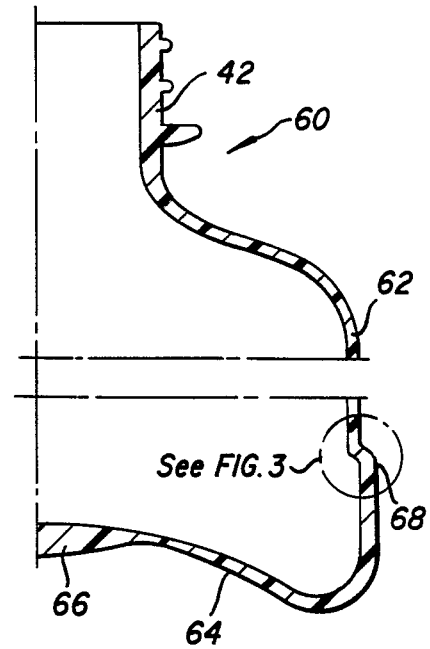
FIG. 2 is a half sectional view through a container blow molded from the preform of FIG. 1 with an intermediate part of the container being omitted.

Reference is now made to FIG. 2 wherein there is illustrated a container 60 in the form of a bottle blow molded from the preform 20. The container 60 will have a neck finish corresponding exactly to the neck finish 42 of the preform. On the other hand, the container 40 will be of a much greater diameter and height than the preform. The container 60 will include a generally cylindrical body 62 and a substantially rigid bottom 64. The bottom 64 will be of progressing thickness towards the center and include a relatively thick center part 66 which will be substantially unstretched or oriented.

The configuration of the bottom portion of the bottle may vary depending upon the product and the type of bottom. Further, if desired, the bottom may terminate adjacent the body 66 in what may be considered to be a chime 68. In any event, it is to be understood that generally in the area in the circle in FIG. 2, there will be a meeting of the core layer 54 and the intermediate layer 52 as is best shown in the enlargement of FIG. 3.

Although only a preferred embodiment of the preform, the manner in which the preform is formed and the container resulting from such preform have been specifically illustrated and described herein, it is to be understood that minor variations may be made therein without departing from the spirit and scope of the invention as defined by the appended claims.

We claim:

1. An injection molded plastic preform for blow molding to form a plastic container, said preform including an open ended mouth forming portion, an intermediate body forming portion, and a closed base forming portion, said preform being of a laminated construction with said body forming portion including inner and outer layers and at least one intermediate layer of a plastic different from the plastic of said inner and outer layers, said intermediate layer terminating generally at said base, said base forming portion also including said inner and outer layers with there being a core layer between said inner and outer layers in at least a bottom part of said base portion, said core layer generally forming a continuation of said intermediate layer and being formed of a plastic different from said intermediate layer.

2. A preform according to claim 1 wherein said core layer extends externally through said outer layer at a bottom of said base portion.

3. A preform according to claim 1 wherein said core layer extends into said intermediate layer to provide a preform portion formed of five layers.

4. A preform according to claim 1 wherein said core layer extends into said intermediate layer to provide a preform portion formed of five layers at a lower portion only of said intermediate layer.

5. A preform according to claim 1 wherein said core layer extends into said intermediate layer to provide a preform portion formed of five layers for a major portion of the length of said intermediate layer.

6. A preform according to claim 1 wherein said core layer extends into said intermediate layer to provide a preform portion formed of five layers for a major portion of the length of said intermediate layer dividing said intermediate layer into inner and outer intermediate layers.

7. A preform according to claim 1 wherein said intermediate layer is selectively a barrier layer, a colored layer on a high Tg layer.

8. A preform according to claim 1 wherein said base portion and a lower part of said body portion define a container bottom forming part, and said core layer extending upwardly beyond said container bottom forming portion.

9. A preform according to claim 1 wherein said inner and outer layers are formed of the same plastic.

10. A preform according to claim 1 wherein said inner and outer layers and said core layer are formed of the same plastic but said core layer has the physical characteristics of being injected at a different temperature from said inner and outer layers.

11. A preform according to claim 1 wherein that portion of said intermediate layer contacted by said core layer is eroded by said core layer due to the high injection temperature of said core layer as compared to the melt temperature of said intermediate layer.

12. A preform according to claim 1 wherein the volume of said core layer is on the order of 10% of the volume of said preform.

13. A preform according to claim 1 wherein the relative volumes of the several layers are said inner and outer layers being 50-60%, said intermediate layer being 30-40%, and said core layer being on the order of 10%.

14. A container formed from the preform of claim 1.

15. A container according to claim 14 wherein said container includes a bottom, and said core layer extends upwardly beyond said bottom.

16. A container according to claim 14 wherein said container includes a bottom portion, a body and a neck finish portion, said body is generally of a three layer construction, said bottom portion is generally of a different three layer construction, and there is an intermediate part between said two three layer constructions of a five layer construction.

* * * * *